Aug. 1, 1950   F. G. DRESSER   2,516,965
SUPPORT FOR BURETTES AND THE LIKE
Filed June 27, 1947
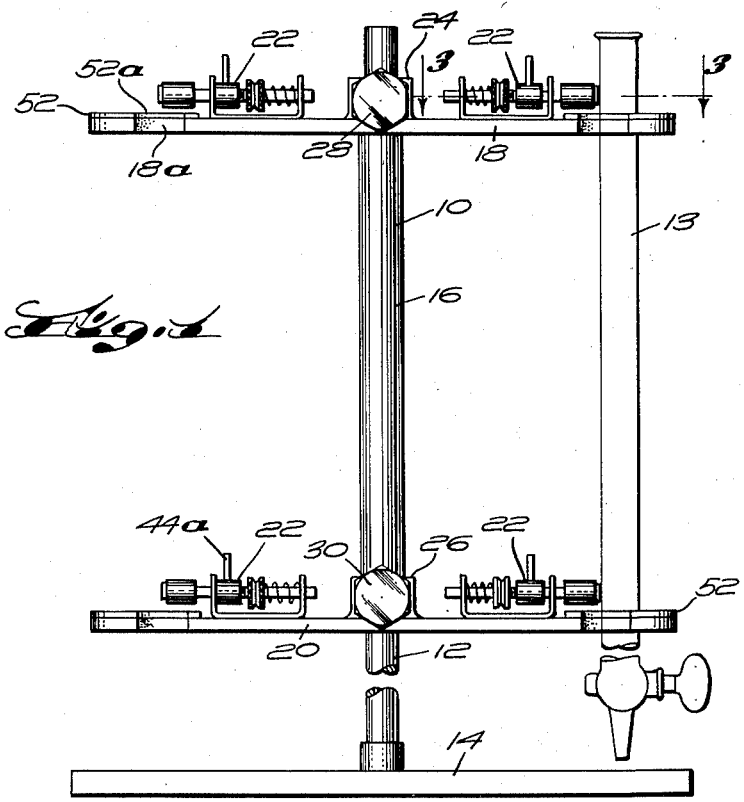
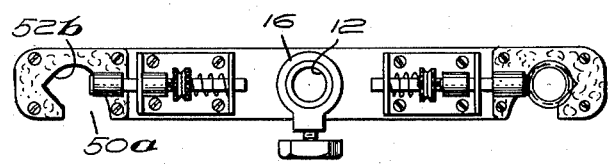
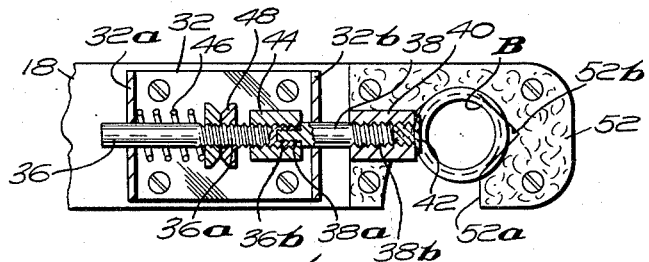
INVENTOR.
Frank G. Dresser
BY
Harry Dexter Reed
Attorney Patented Aug. 1, 1950

2,516,965

UNITED STATES PATENT OFFICE 2,516,965

SUPPORT FOR BURETTES AND THE LIKE

Frank G. Dresser, Providence, R. I.

Application June 27, 1947, Serial No. 757,384

1 Claim. (Cl. 248—121)

The present invention relates to a support for burettes and the like. More specifically it has to do with a support for holding one or more burettes in an adjustable vertical position.

The principal object of the present invention is to provide a burette support of rigid construction, adapted to hold one or more burettes in a vertical adjustable position.

Another object of the present invention is to provide a burette support having a plurality of adjustably resilient burette clamping means, whereby the burette may be readily manually adjusted either vertically or rotationally.

Still another object of the present invention is to provide a burette support having burette clamping means so constructed that a meniscus reading may be readily obtained at all times.

A still further object of the present invention is to provide a burette support consisting of a central vertical tubular member and spaced horizontal arms provided with clamping means consisting of a rigid stationary portion and a spring-pressed portion with spring-compression adjusting means, wherein both clamping portions are provided with fiber contact surfaces to engage the burette walls, thus providing frictional contact with the glass.

With these and other objects and advantageous features in view, the invention is more fully described by the accompanying drawings and description, and the appended claim.

In the drawings:

Fig. 1 is a front elevation of the burette support mounted on a stand, showing a burette clamped in place;

Fig. 2 is a top plan view of the burette support; and

Fig. 3 is an enlarged sectional view of one clamping member taken on line 3—3 of Fig. 1.

Referring now in more detail to the drawings the burette support 10 is mounted on a rod 12 upstanding from a base 14. The burette support has a central tubular member 16 and two spaced horizontal support arms 18 and 20, and four adjustable clamping units 22. The arms 18 and 20 are mounted on the central tubular member by means of bosses 24 and 26 having holes through which the tubular member 16 extends and having clamping bolts 28 and 30 whereby they can be clamped to the tubular member to bring the support arms into spaced parallel relation.

Each support arm 18 and 20 has two clamping units 22 (most clearly shown in Fig. 3) mounted at its outer ends, consisting of a U-shaped element 32 with upturned vertical ends 32a and 32b provided with aligned holes through which extends a shaft assembly comprising an inner section 36 externally threaded as at 36a, and internally threaded as at 36b to receive the correspondingly threaded and 38a of an outer shaft section 38.

The shaft section 38 has external threads 38b on its outer end to receive a correspondingly threaded nut 40 provided with a fiber contact 42 threaded into its outer end. The shaft sections 36 and 38 are locked together by means of a lock nut 44 which also acts as a stop against the vertical end 32b of the element 32. The lock nut 44 has a handle 44a. A spring 46 is provided on the inner shaft section abutting the vertical end 32a and an adjusting nut 48 mounted on the threads 36a of the shaft section 36. Proper spring compression for various diameters of burettes B may be obtained by adjustment of the adusting nut 48.

The ends of the support arms are provided with shaped slots having open front portions 18a and V-shaped portions 18c. A fiber plate 52 attached to the surface of the arm and having a slot 52a therein of like shape as a slot, but just slightly smaller, provides a fiber edge for engagement with a glass tube.

The burette support is mounted at the desired height and radial position on the vertical support rod 12 and locked in place by the clamp screws 28 and 30. The clamp shaft 36—38 is forced back by pressure on the handle 44a and the burette is slipped into place in the slots where it is firmly gripped in a three-point contact by the fiber insert 42 and the V-shaped edges of a slot 52a of the fiber plate 52. The clamping assembly is then adjusted to the desired compression, by the nut 48, whereby the burette is firmly held but may be manually adjusted radially and vertically. The open front portions 18a and 52a of the slots afford a clear view of the meniscus at all times.

It is apparent that I have devised an improved burette holder of rigid construction which firmly grips the burette by two three-point contacts and yet allows it to be manually adjusted indepedntly of the clamps, and wherein the meniscus is readily visible at all times.

While I have described a specific embodiment of my invention, it is understood that certain alterations may be made in the size and shape, of the various parts and in the materials used without departing from the spirit and scope of the appended claim.

I claim:

A support for a burette or the like comprising a vertical standard, a pair of arms adjustably mounted on said standard and extending horizontally therefrom in spaced vertical relation; a slot near the outer end of each said arm having V-shaped edges against which a burette can be positioned; and means on said arm holding a burette in said position; said means comprising a U-shaped element secured to said arm; a shaft having inner and outer sections secured together by a lock nut which serves also as a stop against one end of said V-shaped element; a second nut on one section of the shaft having a fiber insert at its end for engagement with the burette; a spring coiled about the other section of said shaft and seating against the other end of said V-shaped element; and a nut on said other section of said shaft against which the said spring is effective to urge the said fiber insert against the burette, the last said nut being adjustable along the shaft to vary the effective force of said spring.

FRANK G. DRESSER.

REFERENCES CITED

The following references are of record in the file of this patent:

UNITED STATES PATENTS

| Number | Name | Date |
|---|---|---|
| 1,318,899 | Morgan et al. | Oct. 14, 1919 |
| 1,851,735 | Smith | Mar. 29, 1932 |
| 1,915,725 | Fisher | June 27, 1933 |
| 2,077,547 | Busse | Apr. 20, 1937 |